United States Patent
Shuai et al.

(10) Patent No.: US 12,468,427 B2
(45) Date of Patent: Nov. 11, 2025

(54) DISPLAY PANELS AND DISPLAY DEVICES

(71) Applicant: WUHAN CHINA STAR OPTOELECTRONICS SEMICONDUCTOR DISPLAY TECHNOLOGY CO., LTD., Hubei (CN)

(72) Inventors: Shuiqin Shuai, Hubei (CN); Zengjian Jin, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 18/552,907

(22) PCT Filed: May 31, 2023

(86) PCT No.: PCT/CN2023/097616
§ 371 (c)(1),
(2) Date: Sep. 28, 2023

(87) PCT Pub. No.: WO2024/229910
PCT Pub. Date: Nov. 14, 2024

(65) Prior Publication Data
US 2025/0085822 A1   Mar. 13, 2025

(30) Foreign Application Priority Data
May 11, 2023   (CN) ......................... 202310538392.6

(51) Int. Cl.
*G06F 3/044* (2006.01)
*G06F 3/041* (2006.01)
*G06F 3/046* (2006.01)

(52) U.S. Cl.
CPC .......... *G06F 3/0445* (2019.05); *G06F 3/0416* (2013.01); *G06F 3/0446* (2019.05);
(Continued)

(58) Field of Classification Search
None
See application file for complete search history.

(56) References Cited

U.S. PATENT DOCUMENTS

| 2017/0269731 A1* | 9/2017 | Wang ................. G06F 3/0443 |
| 2021/0333940 A1 | 10/2021 | Liu |
| 2022/0197434 A1 | 6/2022 | Wang et al. |

FOREIGN PATENT DOCUMENTS

| CN | 102955639 A | 3/2013 |
| CN | 105204702 A | 12/2015 |

(Continued)

OTHER PUBLICATIONS

International Search Report in International application No. PCT/CN2023/097616, mailed on Jan. 17, 2024.
(Continued)

*Primary Examiner* — Stephen T. Reed
(74) *Attorney, Agent, or Firm* — PV IP PC; Wei Te Chung (57) ABSTRACT

The present disclosure provides a display panel and a display device. A touch layer of the display panel includes: a capacitive touch part including first capacitive touch channels and second capacitive touch channels which are arranged in a cross manner, and an electromagnetic touch part including first electromagnetic touch channels and second electromagnetic touch channels which are arranged in a cross manner. The first capacitive touch channels are insulated between two adjacent first electromagnetic touch channels, and each of the second capacitive touch channels (Continued)

is disposed between and insulated from two adjacent second electromagnetic touch channels.

18 Claims, 6 Drawing Sheets

(52) U.S. Cl.
CPC .... *G06F 3/046* (2013.01); *G06F 2203/04106* (2013.01); *G06F 2203/04111* (2013.01)

(56) References Cited

FOREIGN PATENT DOCUMENTS

| CN | 109976568 A | 7/2019 |
|---|---|---|
| CN | 112732113 A | 4/2021 |
| CN | 113568531 A | 10/2021 |
| CN | 114647343 A | 6/2022 |
| JP | 3200192 U | 10/2015 |
| JP | 2018533085 A | 11/2018 |
| KR | 10-2014-0121811 A | 10/2014 |
| KR | 102193915 B1 | 12/2020 |
| KR | 1020210118020 A | 9/2021 |

OTHER PUBLICATIONS

Written Opinion of the International Search Authority in International application No. PCT/CN2023/097616, mailed on Jan. 17, 2024.
Chinese Office Action issued in corresponding Chinese Patent Application No. 202310538392.6 dated Feb. 24, 2025, pp. 1-7.
Korean Office Action issued in corresponding Korean Patent Application No. 10-2023-7026035 dated Jan. 31, 2025, pp. 1-8.
Japanese Office Action issued in corresponding Japanese Patent Application No. 特願 2023-548958 dated Jul. 22, 2025, pp. 1-3.

* cited by examiner

DISPLAY PANELS AND DISPLAY DEVICES

CROSS REFERENCE TO RELATED APPLICATION

This application is a National Phase of PCT Patent Application No. PCT/CN2023/097616, filed on May 31, 2023, which claims priority to Chinese Application No. 202310538392.6, filed on May 11, 2023. The contents of the above applications are all incorporated by reference as if fully set forth herein in their entirety.

TECHNICAL FIELD

The present disclosure relates to the field of display, and more particularly, to a display panel and a display device.

BACKGROUND

Organic light emitting diode (OLED) display panels, compared with liquid crystal display, have the advantages of being lighter and thinner, good in display effect, high in resolution, wide in color gamut, lower in power consumption, and capable of realizing flexible display. Therefore, the OLED display panel has become a preferred type of display panels for the devices with medium and small sizes after it has been developed rapidly in recent years.

At present, the electromagnetic touch function of the display panel is generally realized by additionally setting an electromagnetic coil layer in or outside the display panel, but this may cause the display panel to have defects of a large overall thickness and a complicated manufacturing process.

In view of the above defects, there is a need to design a light and thin display panel having a relatively simplified manufacturing process.

SUMMARY

The present disclosure provides a display panel and a display device, which can effectively solve the problems that an existing OLED display panel has a large overall thickness and a complicated manufacturing process.

According to a first aspect, the present disclosure provides a display panel including a touch layer, the touch layer including: a capacitive touch part including a plurality of first capacitive touch channels arranged at intervals in a first direction and a plurality of second capacitive touch channels arranged at intervals in a second direction, the first capacitive touch channels extending in the second direction and the second capacitive touch channels extending in the first direction; and an electromagnetic touch part including a plurality of first electromagnetic touch channels arranged at intervals in the first direction and a plurality of second electromagnetic touch channels arranged at intervals in the second direction, the first electromagnetic touch channels extending in the second direction and the second electromagnetic touch channels extending in the first direction, wherein the first direction intersects the second direction, each of the first capacitive touch channels is disposed between and insulated from two adjacent first electromagnetic touch channels, and each of the second capacitive touch channels is disposed between and insulated from two adjacent second electromagnetic touch channels.

Optionally, first ends of every two of the first electromagnetic touch channels are electrically connected to form one first electromagnetic touch channel group; first ends of every two of the second electromagnetic touch channels are electrically connected to form one second electromagnetic touch channel group; two first electromagnetic touch channels in each first electromagnetic touch channel group are not adjacent to each other; and two second electromagnetic touch channels in each second electromagnetic touch channel group are not adjacent to each other.

Optionally, two first electromagnetic touch channels are disposed between any two adjacent first capacitive touch channels, and two second electromagnetic touch channels are disposed between any two adjacent second capacitive touch channels.

Optionally, the first capacitive touch channels located at edges of the display panel are first edge capacitive touch channels, two first electromagnetic touch channels are disposed on a side of each of the first edge capacitive touch channels away from other first capacitive touch channels and belong to different first electromagnetic touch channel groups; the second capacitive touch channels at edges of the display panel are second edge capacitive touch channels, two second electromagnetic touch channels are disposed on a side of each of the second edge capacitive touch channels away from other second capacitive touch channels and belong to different second electromagnetic touch channel groups.

Optionally, first ends of all the first electromagnetic touch channels are electrically connected, and first ends of all the second electromagnetic touch channels are electrically connected; and the display panel further includes a touch driver chip and a switch selection circuit, and the touch driver chip is electrically connected to second ends of the first electromagnetic touch channels and second ends of the second electromagnetic touch channels through the switch selection circuit.

Optionally, one of the first capacitive touch channels is disposed between any two adjacent first electromagnetic touch channels, and one of the second capacitive touch channels is disposed between any two adjacent second electromagnetic touch channels.

Optionally, each of the first capacitive touch channels includes a plurality of first touch electrodes arranged in sequence in the second direction, each of the second capacitive touch channels includes a plurality of second touch electrodes arranged in sequence in the first direction, and the first touch electrodes and the adjacent second touch electrodes constitute touch electrode units; and the touch electrode units are surrounded by the first electromagnetic touch channels and the second electromagnetic touch channels which are arranged in a cross manner.

Optionally, each of the first touch electrodes includes a first body and two first branch parts, the first body extends in the second direction, the two first branch parts are respectively located on both sides of the first body; each of the second touch electrodes includes a second body and two second branch parts, the second body extends in the first direction, and the two second branch parts are respectively located on both sides of the second body; and each of the first branch parts includes a plurality of first branch strips arranged at intervals, and each of the second branch parts includes a plurality of second branch strips arranged at intervals.

Optionally, the touch layer includes a first touch layer and a second touch layer, each of the first capacitive touch channels includes a first portion and a second portion; in a direction perpendicular to a plane in which the display panel is located, the first portion overlaps the second capacitive touch channels, and the second portion does not overlap the second capacitive touch channels; each of the first electromagnetic touch channels includes a third portion and a fourth portion; in the direction perpendicular to the plane in which the display panel is located, the third portion overlaps the second electromagnetic touch channels, and the fourth portion does not overlap the second electromagnetic touch channels; the first portion and the third portion are located at the first touch layer, and the second portion and the fourth portion are located at the second touch layer.

According to a second aspect, the present disclosure provides a display device including a housing and a display panel according to any one of the above, wherein the housing has an accommodating space in which the display panel is disposed.

Beneficial Effect

The present disclosure provides a display panel and a display device, wherein the display panel includes a touch layer, the touch layer includes a capacitive touch part and an electromagnetic touch part. The capacitive touch part includes a plurality of first capacitive touch channels and a plurality of second capacitive touch channels, and the first capacitive touch channels and the second capacitive touch channels are arranged in a cross manner. The electromagnetic touch part includes a plurality of first electromagnetic touch channels and a plurality of second electromagnetic touch channels, and the first electromagnetic touch channels and the second electromagnetic touch channels are arranged in a cross manner. Each of the first capacitive touch channels is disposed between and insulated from two adjacent first electromagnetic touch channels. Each of the second capacitive touch channels is disposed between and insulated from two adjacent second electromagnetic touch channels. The display panel and the display device according to the present disclosure can reduce the thickness of the display panel, simplify the production and preparation process, and make the display panel have the functions of electromagnetic touch and capacitive touch, while the electromagnetic touch signal and the capacitance touch signal do not interfere with each other.

BRIEF DESCRIPTION OF THE DRAWINGS

In order to illustrate the technical solutions in the embodiments of the present disclosure clearly, the accompanying drawings involved in the description of the embodiments are described briefly below. It will be apparent that the accompanying drawings in the following description are merely some of the embodiments of the present disclosure, and based on these drawings, other drawings may be made to those skilled in the art without involving any inventive effort.

LIST OF REFERENCE NUMBERS display panel 01; display panel body 02; touch layer 03; first touch layer 04; first portion 041; third portion 042; second touch layer 05; second portion 051; fourth portion 052; touch insulation layer 06; first direction X; second direction Y; capacitive touch part 10; first capacitive touch channel 11; first edge capacitive touch channel 110; first end of the first capacitive touch channel 111; second end of the first capacitive touch channel 112; first touch electrode 113; first body 1131; first branch part 1132; first branch strip 1133; second capacitive touch channel 12; second edge capacitive touch channel 120; first end of the second capacitive touch channel 121; second end of the second capacitive touch channel 122; second touch electrode 123; second body 1231; second branch part 1232; second branch strip 1233; electromagnetic touch part 20; first electromagnetic touch channel 21; first end of the first electromagnetic touch channel 211; second end of the first electromagnetic touch channel 212; second electromagnetic touch channel 22; first end of the second electromagnetic touch channel 221; second end of the second electromagnetic touch channel 222; touch driver chip 30; switch selection circuit 31; first electromagnetic touch channel group 40; second electromagnetic touch channel group 50; touch electrode unit TRD; dummy electrode B.

DETAILED DESCRIPTION OF THE EMBODIMENTS

The technical solutions of the embodiments of the present disclosure will be described below clearly and fully, in connection with the accompanying drawings. It will be apparent that the described embodiments are merely a part of the embodiments of the present disclosure, rather than all the embodiments. Based on the embodiments of the present disclosure, all other embodiments obtained by a person skilled in the art without involving any inventive effort are within the scope of the present disclosure. Furthermore, it is to be understood that the specific embodiments described herein are for purposes of illustration and explanation only and are not intended to limit the application. In the present disclosure, in the absence of any indication to the contrary, directional terms used herein such as "upper" and "lower" usually refer to the upper and lower positions of the device in the actual use or working state, specifically the direction of the figures of the accompanying drawings, and terms "inner" and "outer" refer to the profile of the device.

The following disclosure provides many different embodiments or examples for implementing the different structures of the present disclosure. In order to simplify the disclosure of the present disclosure, components and arrangements of specific examples are described below. Certainly, they are merely examples and are not intended to limit the application. In addition, the present disclosure may repeat reference numerals and/or reference symbols in various instances, and such repetition is for the purpose of simplicity and clarity, without indicating a relationship between the various embodiments and/or arrangements discussed. In addition, the present disclosure provides examples of various specific processes and materials, but one of ordinary skill in the art will recognize the application of other processes and/or the use of other materials. In the following detailed description, it is to be noted that the order in which the following embodiments are described is not intended to limit the preferred order of the embodiments.

Example 1

Figure 1:
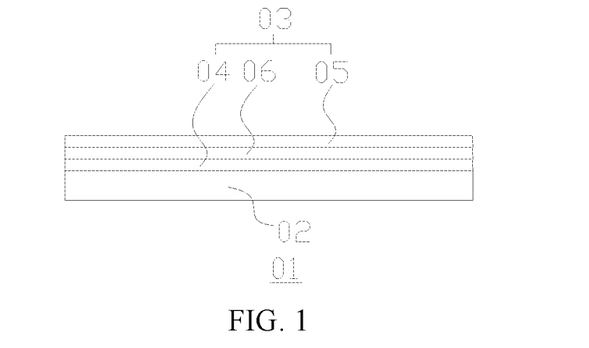
FIG. 1 is a schematic structural diagram of film layers of a display panel according to Example 1 of the present disclosure.
Figure 2:
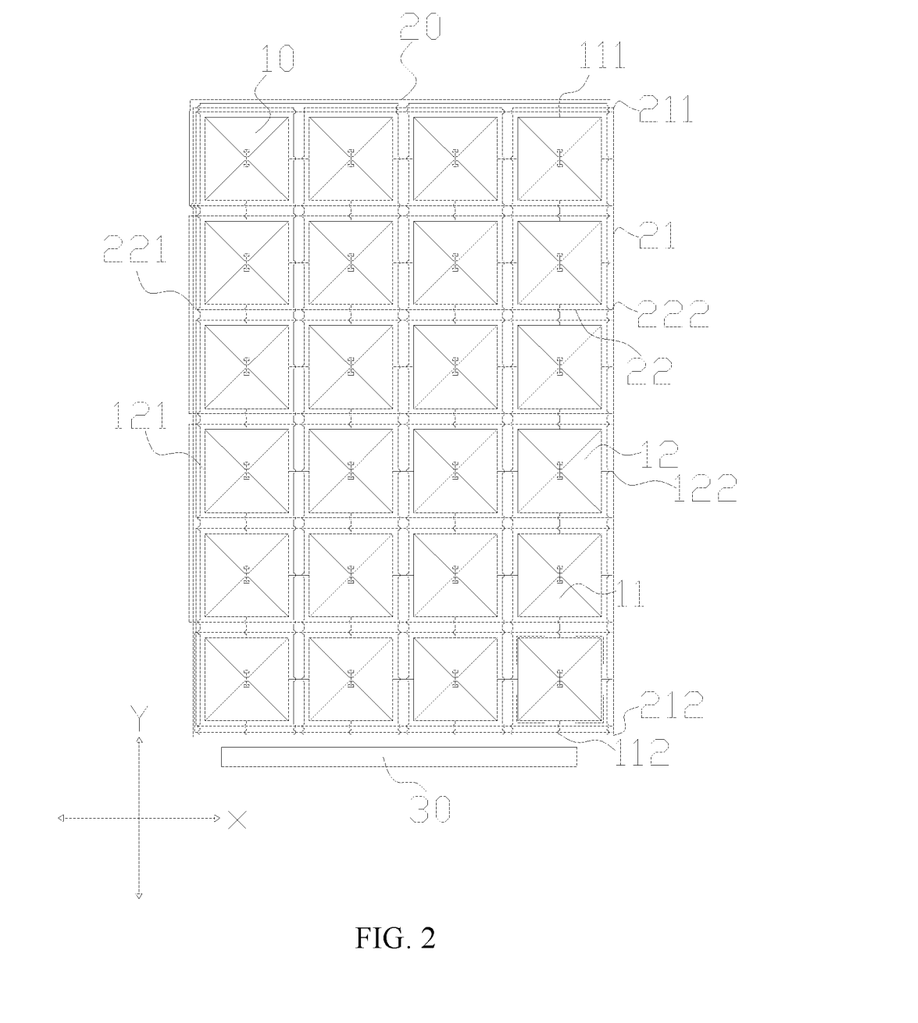
FIG. 2 is a schematic plan view of a capacitive touch part and an electromagnetic touch part according to Example 1 of the present disclosure.
Figure 3:
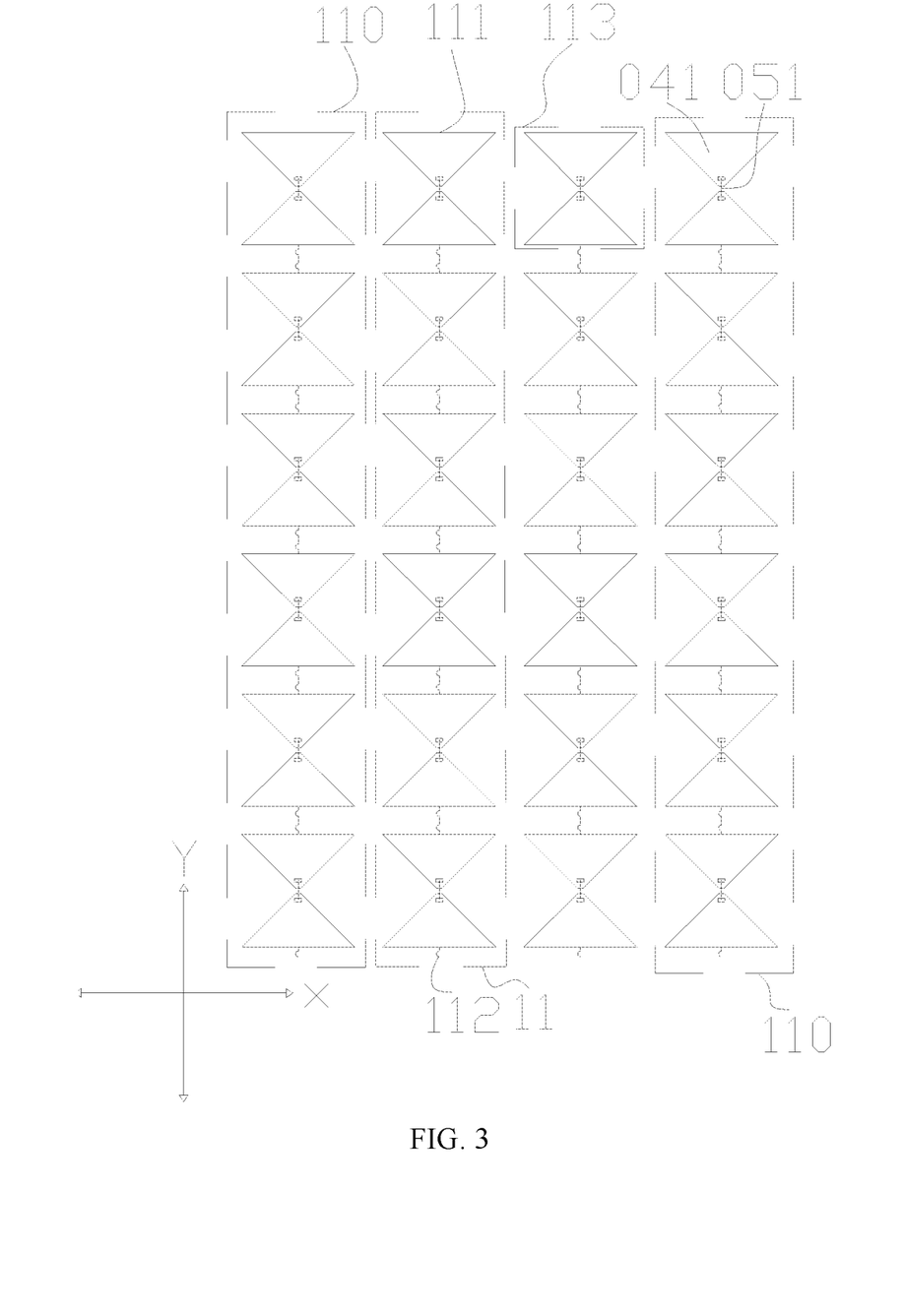
FIG. 3 is a schematic plan view of a first capacitive touch channel according to Example 1 of the present disclosure.
Figure 4:
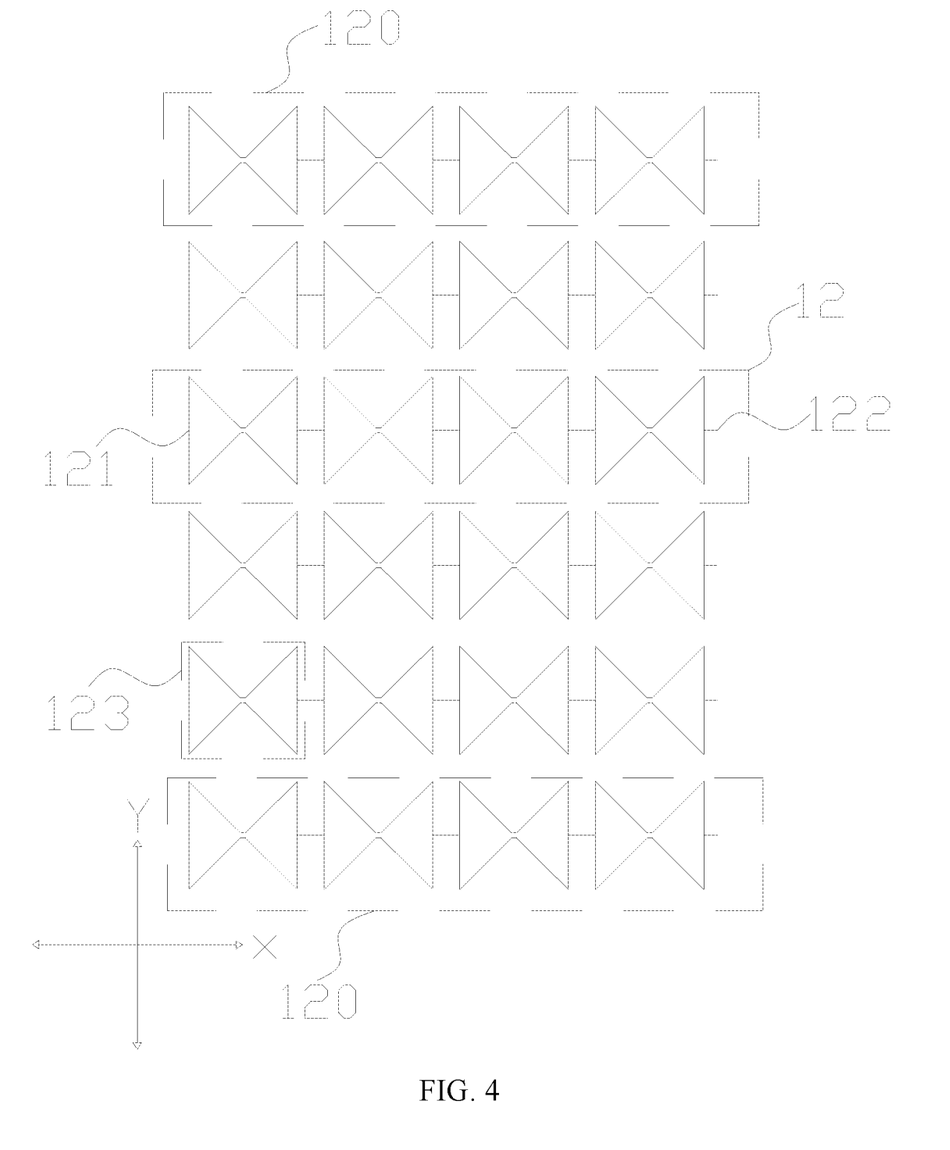
FIG. 4 is a schematic plan view of a second capacitive touch channel according to Example 1 of the present disclosure.
Figure 5:
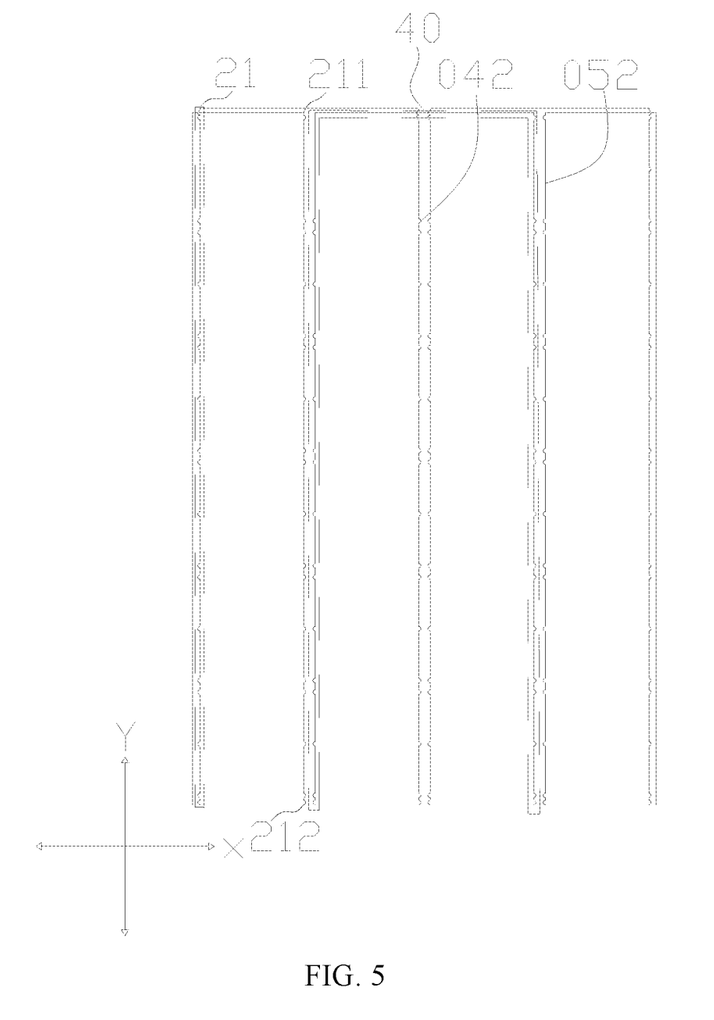
FIG. 5 is a schematic plan view of a first electromagnetic touch channel according to Example 1 of the present disclosure.
Figure 6:
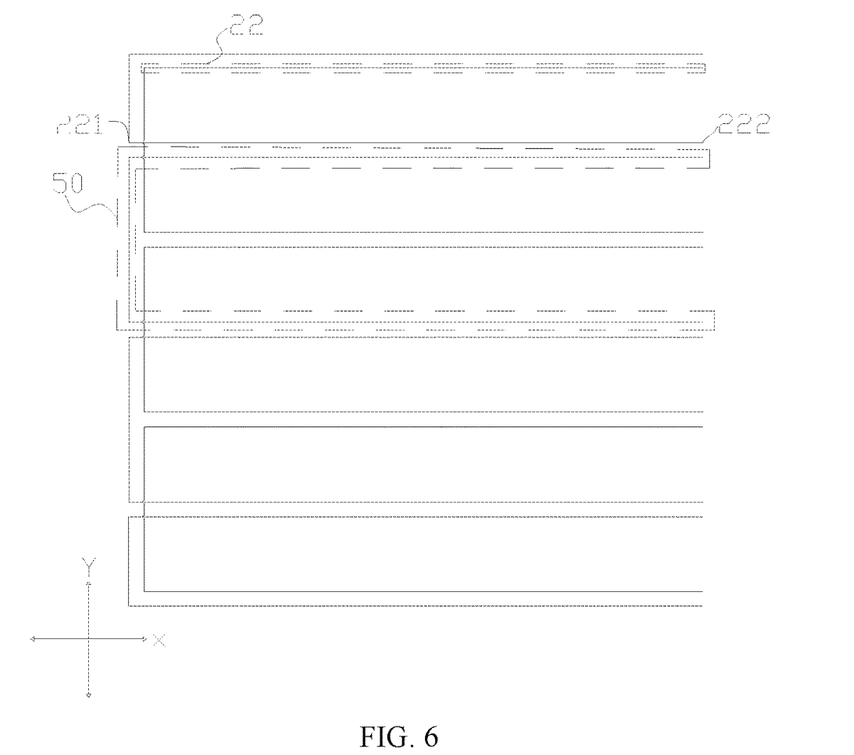
FIG. 6 is a schematic plan view of a second electromagnetic touch channel according to Example 1 of the present disclosure.

FIG. 1 is a schematic structural view of film layers of a display panel according to Example 1 of the present disclosure. FIG. 2 is a schematic plan view of a capacitive touch part and an electromagnetic touch part according to Example 1 of the present disclosure. FIG. 3 is a schematic plan view of a first capacitive touch channel according to Example 1 of the present disclosure. FIG. 4 is a schematic plan view of a second capacitive touch channel according to Example 1 of the present disclosure. FIG. 5 is a schematic plan view of a first electromagnetic touch channel according to Example 1 of the present disclosure. FIG. 6 is a schematic plan view of a second electromagnetic touch channel according to Example 1 of the present disclosure. Referring to FIGS. 1 to 6, in a first aspect, an embodiment of the present disclosure provides a display panel 01 including a touch layer 03. The touch layer 03 includes a capacitive touch part 10 and an electromagnetic touch part 20. The capacitive touch part 10 includes a plurality of first capacitive touch channels 11 arranged at intervals in a first direction X and a plurality of second capacitive touch channels 12 arranged at intervals in a second direction Y. The first capacitive touch channels 11 extend in the second direction Y, and the second capacitive touch channels 12 extend in the first direction X. The electromagnetic touch part 20 includes a plurality of first electromagnetic touch channels 21 arranged at intervals in the first direction X and a plurality of second electromagnetic touch channels 22 arranged at intervals in the second direction Y. The first electromagnetic touch channels 21 extend in the second direction Y, and the second electromagnetic touch channels 22 extend in the first direction X. The first direction X intersects the second direction Y. Each of the first capacitive touch channels 11 is disposed between and insulated from two adjacent first electromagnetic touch channels 21, and each of the second capacitive touch channels 12 is disposed between and insulated from two adjacent second electromagnetic touch channels 22.

According to the display panel 01 provided in the present disclosure, each first capacitive touch channel 11 is provided between two adjacent first electromagnetic touch channels 21, and thus the first electromagnetic touch channels 21 and the first capacitive touch channels 11 do not overlap in a direction perpendicular to a plane in which the display panel 01 is located. Each second capacitive touch channel 12 is provided between two adjacent second electromagnetic touch channels 22, and thus the second electromagnetic touch channels 22 and the second capacitive touch channels 12 do not overlap in the direction perpendicular to the plane in which the display panel 01 is located. Therefore, the capacitive touch part 10 and the electromagnetic touch part 20 can share a space in the direction perpendicular to the plane in which the display panel 01 is located, thereby achieving a structural design in which both the capacitive touch part 10 and the electromagnetic touch part 20 are disposed in the touch layer 03, reducing the thickness of the display panel 01 and simplifying the manufacturing process.

Further, since the first capacitive touch channels 11 are insulated from the first electromagnetic touch channels 21, and the second capacitive touch channels 12 are insulated from the second electromagnetic touch channels 22, the display panel 01 has the functions of electromagnetic touch and capacitance touch, while the electromagnetic touch signal and the capacitance touch signal do not interfere with each other.

In some embodiments of the present disclosure, the first direction X is the transverse direction in FIG. 2, and the second direction Y is the longitudinal direction in FIG. 2, but the specific orientation of the first direction X and the second direction Y is not limited in the present disclosure. For example, in other embodiments of the present disclosure, the first direction X may be the longitudinal direction in FIG. 2, and the second direction Y may be the transverse direction in FIG. 2.

In some embodiments of the present disclosure, the first ends 211 of every two of the first electromagnetic touch channels 21 are electrically connected to form one first electromagnetic touch channel group 40. The first ends 221 of every two of the second electromagnetic touch channels 22 are electrically connected to form one second electromagnetic touch channel group 50. Two first electromagnetic touch channels 21 in each first electromagnetic touch channel group 40 are not adjacent to each other. Two second electromagnetic touch channels 22 in each second electromagnetic touch channel group 50 are not adjacent to each other.

According to the display panel 01 provided in the present disclosure, the two first electromagnetic touch channels 21 in each first electromagnetic touch channel group 40 are not adjacent to each other, and the two second electromagnetic touch channels 22 in each second electromagnetic touch channel group 50 are not adjacent to each other, meaning that at least one first electromagnetic touch channel 21 in another first electromagnetic touch channel group 40 is disposed between the two first electromagnetic touch channels 21 in the first electromagnetic touch channel group 40, and at least one second electromagnetic touch channel 22 in another second electromagnetic touch channel group 50 is disposed between the two second electromagnetic touch channels 22 in the second electromagnetic touch channel group 50. Thus, in the direction perpendicular to the plane in which the display panel 01 is located, a region defined by each first electromagnetic touch channel group 40 overlaps a region defined by at least one of other first electromagnetic touch channel groups 40, and a region defined by each second electromagnetic touch channel group 50 overlaps a region defined by at least one of other second electromagnetic touch channel groups 50, thereby realizing the nesting of the electromagnetic coils and greatly improving the electromagnetic driving capability of the electromagnetic touch part 20.

Further, the first ends 111 of the first capacitive touch channels 11 are insulated from the first electromagnetic touch channels 21. The first ends 121 of the second capacitive touch channels 12 are insulated from the second electromagnetic touch channels 22.

In some embodiments of the present disclosure, the display panel 01 further includes a touch driver chip 30. The second ends 112 of the first capacitive touch channels 11, the second ends 122 of the second capacitive touch channels 12, the second ends 212 of the first electromagnetic touch channels 21, and the second ends 222 of the second electromagnetic touch channels 22 are all electrically connected to the touch driver chip 30.

According to the display panel 01 provided in the present disclosure, since the second ends 112 of the first capacitive touch channels 11, the second ends 122 of the second capacitive touch channels 12, the second ends 212 of the first electromagnetic touch channels 21, and the second ends 222 of the second electromagnetic touch channels 22 are all electrically connected to the touch driver chip 30, the display panel 01 enables to control each capacitive touch channel in the capacitive touch part 10 and each electromagnetic touch channel in the electromagnetic touch part 20 through only one touch driver chip 30, thereby improving the integration degree of the display panel 01 and facilitating reduction of the lower frame width of the display panel 01.

In some embodiments of the present disclosure, two first electromagnetic touch channels 21 are disposed between any two adjacent first capacitive touch channels 11, and two second electromagnetic touch channels 22 are disposed between any two adjacent second capacitive touch channels 12.

According to the display panel 01 provided in the present disclosure, two first electromagnetic touch channels 21 are disposed between any two adjacent first capacitive touch channels 11, and two second electromagnetic touch channels 22 are disposed between any two adjacent second capacitive touch channels 12, thereby greatly improving the touch accuracy of the electromagnetic touch part 20, and improving the electromagnetic touch quality.

Further, the first capacitive touch channels 11 located at edges of the display panel 01 are first edge capacitive touch channels 110. Two first electromagnetic touch channels 21 are disposed on a side of each of the first edge capacitive touch channels 110 away from the other first capacitive touch channels 11 and belong to different first electromagnetic touch channel groups 40. The second capacitive touch channels 12 located at edges of the display panel 01 are second edge capacitive touch channels 120. Two second electromagnetic touch channels 22 are disposed on a side of each of the second edge capacitive touch channels 120 away from the other second capacitive touch channels 12 and belong to different second electromagnetic touch channel groups 50.

According to the display panel 01 provided in the present disclosure, two first electromagnetic touch channels 21 are disposed on a side of each of the first edge capacitive touch channels 110 away from the other first capacitive touch channels 11 and belong to different first electromagnetic touch channel groups 40, so that the first electromagnetic touch channel groups 40 located at the edges of the display panel 01 can be nested with the other first electromagnetic touch channel groups 40.

Similarly, according to the display panel 01 provided in the present disclosure, two second electromagnetic touch channels 22 are disposed on a side of each of the second edge capacitive touch channels 120 away from the other second capacitive touch channels 12 and belong to different second electromagnetic touch channel groups 50, so that the second electromagnetic touch channel groups 50 located at the edges of the display panel 01 can be nested with the other second electromagnetic touch channel groups 50.

Figure 7:
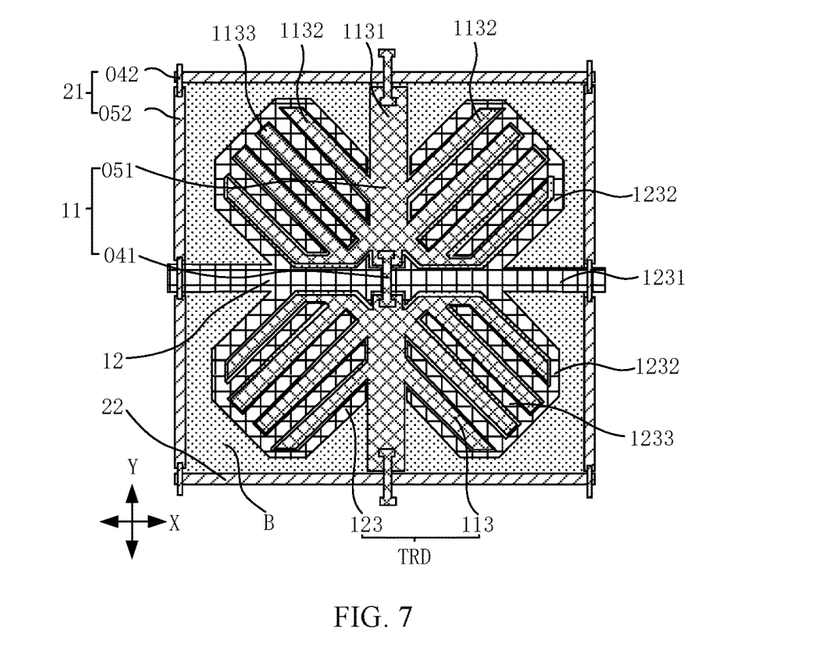
FIG. 7 is a schematic plan view of a touch electrode unit according to Example 1 of the present disclosure.

FIG. 7 is a schematic plan view of a touch electrode unit according to Example 1 of the present disclosure. As shown in FIGS. 1 to 7, in some embodiments of the present disclosure, each of the first capacitive touch channels 11 includes a plurality of first touch electrodes 113 arranged in sequence in the second direction Y, each of the second capacitive touch channels 12 includes a plurality of second touch electrodes 123 arranged in sequence in the first direction X, and adjacent first touch electrodes 113 and second touch electrodes 123 constitute touch electrode units TRD. The touch electrode units TRD are surrounded by the first electromagnetic touch channels 21 and the second electromagnetic touch channels 22 which are arranged in a cross manner.

According to the display panel 01 provided in the present disclosure, the touch electrode units TRD are surrounded by the first electromagnetic touch channels 21 and the second electromagnetic touch channels 22 which are arranged in a cross manner, so that the touch electrode units TRD do not overlap the first electromagnetic touch channels 21 and the second electromagnetic touch channels 22 in the direction perpendicular to the plane in which the display panel 01 is located, thereby achieving the structural design in which both the capacitive touch part 10 and the electromagnetic touch part 20 are disposed in the touch layer 03, and achieving the purpose of reducing the thickness of the display panel 01 and simplifying the manufacturing process.

Specifically, the touch electrode units TRD can be surrounded by the first electromagnetic touch channels 21 and the second electromagnetic touch channels 22 which are arranged in a cross manner, by reducing the area of the touch electrode units TRD.

Further, dummy electrodes B are disposed between the touch electrode units TRD and the first and second electromagnetic touch channels 21 and 22 which are arranged in a cross manner. The dummy electrodes B are insulated from the touch electrode units TRD, the first electromagnetic touch channels 21, and the second electromagnetic touch channels 22.

In some embodiments of the present disclosure, each of the first touch electrodes 113 includes a first body 1131 extending in the second direction Y, and two first branch parts 1132 located on both sides of the first body 1131, respectively. Each of the second touch electrodes 123 includes a second body 1231 extending in the first direction X, and two second branch parts 1232 located on both sides of the second body 1231, respectively. Each of the first branch parts 1132 includes a plurality of first branch strips 1133 arranged at intervals, and each of the second branch parts 1232 includes a plurality of second branch strips 1233 arranged at intervals.

According to the display panel 01 provided in the present disclosure, since each of the first branch parts 1132 includes the plurality of first branch strips 1133 disposed at intervals, the amount of capacitance coupling of the first touch electrodes 113 can be increased. Since each of the second branch parts 1232 includes the plurality of second branch strips 1233 provided at intervals, the amount of capacitance coupling of the second touch electrodes 123 can be improved. Therefore, the touch accuracy of the capacitive touch part 10 can be improved, thereby avoiding a problem that the capacitance touch quality decreases due to the reduction of the area of the touch electrode units TRD.

Optionally, the two first branch parts 1132 located on both sides of the first body 1131 are axially symmetrical with respect to the first body 1131. The two second branch parts 1232 located on both sides of the second body 1231 are axially symmetrical with respect to the second body 1231.

Optionally, each of the first branch parts 1132 includes two first sub-branch parts which are axially symmetrical with respect to the second body 1231, and each of the first sub-branch parts includes the plurality of first branch strips 1133 arranged at intervals. Each of the second branch parts 1232 includes two second sub-branch parts which are axially symmetrical with respect to the first body 1131, and each of the second sub-branch parts includes the plurality of second branch strips 1233 arranged at intervals.

In some embodiments of the present disclosure, the touch layer 03 includes a first touch layer 04 and a second touch layer 05. Each of the first capacitive touch channels 11 includes a first portion 041 and a second portion 051. In the direction perpendicular to the plane in which the display panel 01 is located, the first portion 041 overlaps the second capacitive touch channels 12, and the second portion 051 does not overlap the second capacitive touch channels 12. Each of the first electromagnetic touch channels 21 includes a third portion 042 and a fourth portion 052. In the direction perpendicular to the plane in which the display panel 01 is located, the third portion 042 overlaps the second electromagnetic touch channels 22, and the fourth portion 052 does not overlap the second electromagnetic touch channels 22. The first portion 041 and the third portion 042 are located in the first touch layer 04, and the second portion 051 and the fourth portion 052 are located in the second touch layer 05.

According to the display panel 01 provided in the present disclosure, the first portion 041 overlaps the second capacitive touch channels 12, and the third portion 042 overlaps the second electromagnetic touch channels 22, meaning that the first portion 041 is a bridging portion of the capacitive touch part 10, and the third portion 042 is a bridging portion of the electromagnetic touch part 20. The second portion 051 does not overlap the second electromagnetic touch channels 22, and the fourth portion 052 does not overlap the second electromagnetic touch channels 22, meaning that the second portion 051 and the second capacitive touch channels 12 belong to a main body of the capacitive touch part 10, and the fourth portion 052 and the second electromagnetic touch channels 22 belong to a main body of the electromagnetic touch part 20.

According to the present disclosure, the bridging portions of the capacitive touch part 10 and the bridging portions of the electromagnetic touch part 20 are provided in the same layer, and the main bodies of the capacitive touch part 10 and the main bodies of the electromagnetic touch part 20 are provided in the same layer, so that the capacitive touch part 10 and the electromagnetic touch part 20 can share a film layer, thereby realizing the purpose of reducing the thickness of the display panel 01 and simplifying the manufacturing process.

Further, the dummy electrodes B are provided in the same layer as the second portions 051. That is, the dummy electrodes B are located in the second touch layer 05.

In some embodiments of the present disclosure, the display panel 01 includes a display panel body 02 including a plurality of pixel cells in an array. The sub-pixel may be an OLED pixel cell, an LED pixel cell, a liquid crystal pixel cell, or the like.

In some embodiments of the present disclosure, the touch layer 03 is provided on a display side of the display panel body 02. The display side refers to a side on which a user can view a display picture of the display panel 01. The first touch layer 04 and the second touch layer 05 are stacked on the display side of the display panel body 02 in sequence. A touch insulating layer 06 is disposed between the first touch layer 04 and the second touch layer 05. Certainly, the relative positional relationship of the first touch layer 04 and the second touch layer 05 with respect to the display panel body 02 is not limited in the present disclosure. For example, in other embodiments of the present disclosure, the second touch layer 05 and the first touch layer 04 are stacked in sequence on the display side of the display panel body 02.

According to a second aspect, an embodiment of the present disclosure provides a display device including a housing and a display panel 01 according to any one of the above embodiments. The housing has an accommodating space in which the display panel 01 is disposed.

Example 2

Figure 8:
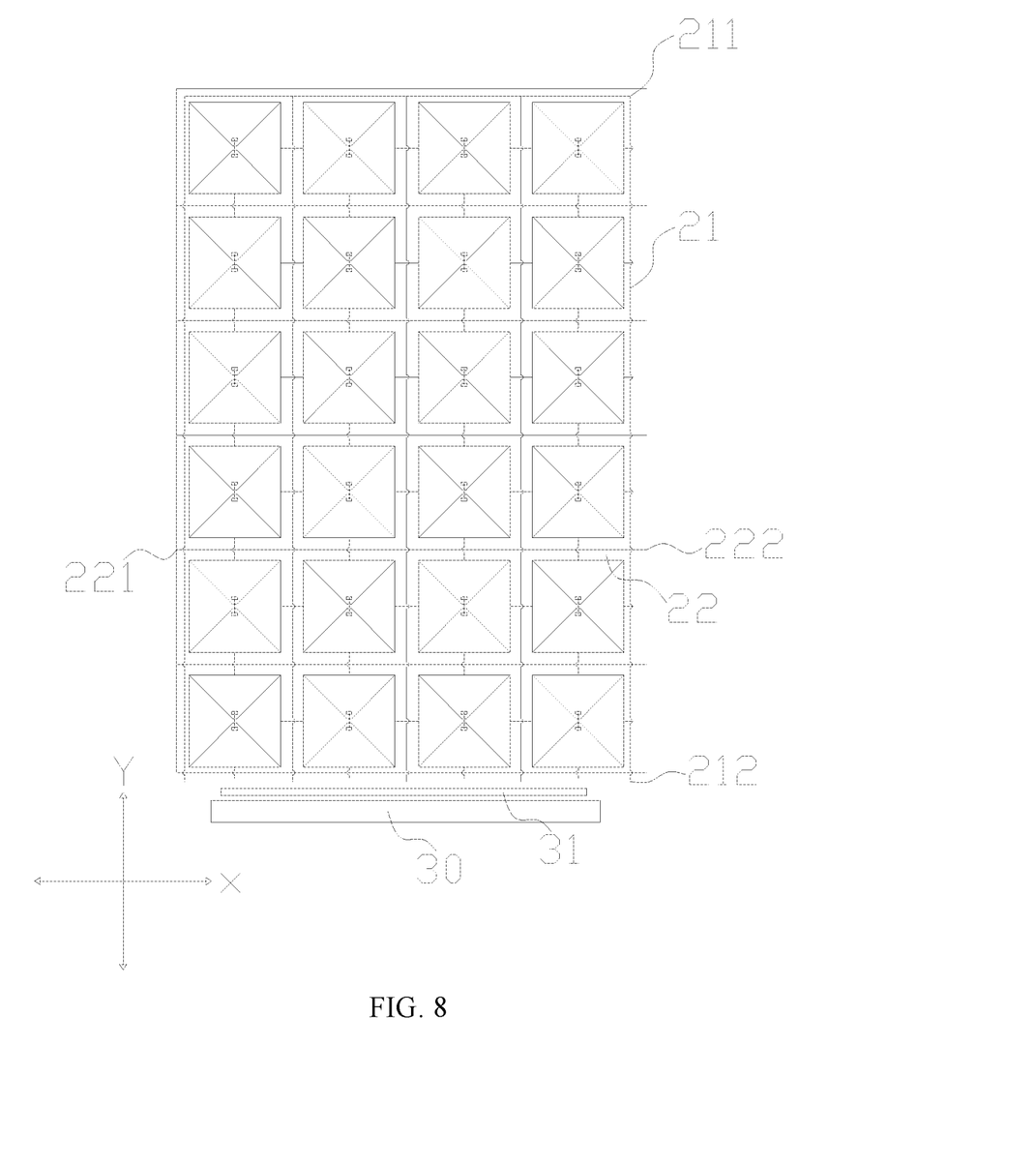
FIG. 8 is a schematic plan view of a capacitive touch part and an electromagnetic touch part according to Example 2 of the present disclosure.

FIG. 8 is a schematic plan view of a capacitive touch part and an electromagnetic touch part according to Example 2 of the present disclosure. As shown in FIG. 1, FIGS. 3 and 4, and FIGS. 7 and 8, Example 2 of the present disclosure provides a display panel 01 and a display device. The display panel 01 includes a touch layer 03, which includes a capacitive touch part 10 and an electromagnetic touch part 20. The capacitive touch part 10 includes a plurality of first capacitive touch channels 11 arranged at intervals in a first direction X and a plurality of second capacitive touch channels 12 arranged at intervals in a second direction Y. The first capacitive touch channels 11 extend in the second direction Y, and the second capacitive touch channels 12 extend in the first direction X. The electromagnetic touch part 20 includes a plurality of first electromagnetic touch channels 21 arranged at intervals in the first direction X and a plurality of second electromagnetic touch channels 22 arranged at intervals in the second direction Y. The first electromagnetic touch channels 21 extend in the second direction Y, and the second electromagnetic touch channels 22 extend in the first direction X. The first direction X intersects the second direction Y. Each of the first capacitive touch channels 11 is disposed between and insulated from two adjacent first electromagnetic touch channels 21, and each of the second capacitive touch channels 12 is disposed between and insulated from two adjacent second electromagnetic touch channels 22. The display device includes a housing and the display panel 01, wherein the housing has an accommodating space in which the display panel 01 is disposed.

It is to be noted that the structure of the display panel 01 and the display device provided in Example 2 of the present disclosure is similar to that of the display panel 01 and the display device provided in Example 1 of the present disclosure, and details of the same parts are not repeated in Example 2 of the present disclosure.

It is different in Example 2 that, the first ends 211 of all the first electromagnetic touch channels 21 are electrically connected, and the first ends 221 of all the second electromagnetic touch channels 22 are electrically connected. The display panel 01 further includes a touch driver chip 30 and a switch selection circuit 31. The touch driver chip 30 is electrically connected to the second ends 212 of the first electromagnetic touch channels 21 and the second ends 222 of the second electromagnetic touch channels 22 through the switch selection circuit 31.

According to the display panel 01 provided in the present disclosure, the touch driver chip 30 is electrically connected to the second ends 212 of the first electromagnetic touch channels 21 through the switch selection circuit 31, and the switch selection circuit 31 is capable of independently conducting or closing the electrical connection state between the first electromagnetic touch channels 21 and the touch driver chip 30, so that any two first electromagnetic touch channel groups 40 of all the first electromagnetic touch channels 21 electrically connected to the first ends 211 can be formed into a closed electromagnetic coil through the switch selection circuit 31. Similarly, the touch driver chip 30 is electrically connected to the second ends 222 of the second electromagnetic touch channels 22 through the switch selection circuit 31, and the switch selection circuit 31 can independently conduct or close the electrical connection state between the second electromagnetic touch channel 22 and the touch driver chip 30, so that any two second electromagnetic touch channel groups 50 of all the second electromagnetic touch channels 22 electrically connected to the first ends 221 can be formed into a closed electromagnetic coil through the switch selection circuit 31, thereby realizing the electromagnetic touch function and freely adjusting the spacing between the electromagnetic touch channels in the electromagnetic coils.

The first ends 211 of all the first electromagnetic touch channels 21 are electrically connected to each other, and the first ends 221 of all the second electromagnetic touch channels 22 are electrically connected to each other, the wiring structure of the first ends 211 of the first electromagnetic touch channels 21 and the first ends 221 of the second electromagnetic touch channels 22 can be simplified to reduce the number of channels and realize the narrow frame, thereby simplifying the manufacturing process of the display panel 01, and reducing the production cost of the display panel 01.

In summary, the present disclosure provides a display panel and a display device. The display panel includes a touch layer, which includes a capacitive touch part and an electromagnetic touch part. The capacitive touch part includes the plurality of first capacitive touch channels arranged at intervals in the first direction and the plurality of second capacitive touch channels arranged at intervals in the second direction. The first capacitive touch channels extend in the second direction, and the second capacitive touch channels extend in the first direction. The electromagnetic touch part includes the plurality of first electromagnetic touch channels arranged at intervals in the first direction and the plurality of second electromagnetic touch channels arranged at intervals in the second direction. The first electromagnetic touch channels extend in the second direction and the second electromagnetic touch channels extend in the first direction. The first direction intersects the second direction. Each of the first capacitive touch channels is disposed between and insulated from two adjacent first electromagnetic touch channels, and each of the second capacitive touch channels is disposed between and insulated from two adjacent second electromagnetic touch channels. According to the display panel and the display device provided by the disclosure, the capacitive touch part and the electromagnetic touch part can share the space in the direction perpendicular to the plane in which the display panel is located, so that the structure design in which the capacitive touch part and the electromagnetic touch part are arranged in the touch layer is realized, the thickness of the display panel is reduced, the production preparation process is simplified, and the display panel has the functions of electromagnetic touch and capacitance touch, and the electromagnetic touch signal and the capacitance touch signal do not interfere with each other.

The foregoing describes in detail a display panel and a display device according to an embodiment of the present disclosure, and the principles and implementations of the present disclosure are described herein using specific examples. The description of the above embodiments is merely provided to help understand the method of the present disclosure and the core idea thereof. Variations will be made to those skilled in the art in both the detailed description and the scope of application in accordance with the teachings of the present disclosure. In view of the foregoing, the present description should not be construed as limiting the application.

What is claimed is:

1. A display panel comprising a touch layer, the touch layer comprising:
    a capacitive touch part comprising a plurality of first capacitive touch channels arranged at intervals in a first direction and a plurality of second capacitive touch channels arranged at intervals in a second direction, the first capacitive touch channels extending in the second direction and the second capacitive touch channels extending in the first direction; and
    an electromagnetic touch part comprising a plurality of first electromagnetic touch channels arranged at intervals in the first direction and a plurality of second electromagnetic touch channels arranged at intervals in the second direction, the first electromagnetic touch channels extending in the second direction and the second electromagnetic touch channels extending in the first direction;
    wherein the first direction intersects the second direction, each of the first capacitive touch channels is disposed between and insulated from two adjacent first electromagnetic touch channels, and each of the second capacitive touch channels is disposed between and insulated from two adjacent second electromagnetic touch channels,
    the display panel further comprises a touch driver chip and a switch selection circuit, first ends of all the first electromagnetic touch channels away from the touch driver chip in the second direction are electrically connected to each other; and second ends of all the first electromagnetic touch channels close to the touch driver chip in the second direction are electrically connected to the touch driver chip via the switch selection circuit, and
    the switch selection circuit independently turns on or off a connection between each of the first electromagnetic touch channels and the touch driver chip, so that any two first electromagnetic touch channels of all the first electromagnetic touch channels form into a closed electromagnetic coil through the switch selection circuit.

2. The display panel according to claim 1, wherein first ends of every two of the first electromagnetic touch channels are electrically connected to form one first electromagnetic touch channel group; first ends of every two of the second electromagnetic touch channels are electrically connected to form one second electromagnetic touch channel group; two first electromagnetic touch channels in each first electromagnetic touch channel group are not adjacent to each other; and two second electromagnetic touch channels in each second electromagnetic touch channel group are not adjacent to each other.

3. The display panel according to claim 2, wherein two first electromagnetic touch channels are disposed between any two adjacent first capacitive touch channels, and two second electromagnetic touch channels are disposed between any two adjacent second capacitive touch channels.

4. The display panel according to claim 3, wherein the first capacitive touch channels located at edges of the display panel are first edge capacitive touch channels, two first electromagnetic touch channels are disposed on a side of each of the first edge capacitive touch channels away from other first capacitive touch channels and belong to different first electromagnetic touch channel groups; the second capacitive touch channels at edges of the display panel are second edge capacitive touch channels, two second electromagnetic touch channels are disposed on a side of each of the second edge capacitive touch channels away from other second capacitive touch channels and belong to different second electromagnetic touch channel groups.

5. The display panel according to claim 1, wherein one of the first capacitive touch channels is disposed between any two adjacent first electromagnetic touch channels, and one of the second capacitive touch channels is disposed between any two adjacent second electromagnetic touch channels.

6. The display panel according to claim 1, wherein each of the first capacitive touch channels comprises a plurality of first touch electrodes arranged in sequence in the second direction, each of the second capacitive touch channels comprises a plurality of second touch electrodes arranged in sequence in the first direction, and the first touch electrodes and the adjacent second touch electrodes constitute one touch electrode unit of touch electrode units; and the touch electrode units are surrounded by the first electromagnetic touch channels and the second electromagnetic touch channels which are arranged in a cross manner.

7. The display panel according to claim 6, wherein each of the first touch electrodes comprises a first body and two first branch parts, the first body extends in the second direction, the two first branch parts are respectively located on both sides of the first body; each of the second touch electrodes comprises a second body and two second branch parts, the second body extends in the first direction, and the two second branch parts are respectively located on both sides of the second body; and each of the first branch parts comprises a plurality of first branch strips arranged at intervals, and each of the second branch parts comprises a plurality of second branch strips arranged at intervals.

8. The display panel according to claim 6, wherein dummy electrodes are disposed between the first electromagnetic touch channels and the second electromagnetic touch channels which are arranged in a cross manner and the touch electrode units, and the dummy electrodes are insulated from the first electromagnetic touch channels, the second electromagnetic touch channels, and the touch electrode units, respectively.

9. The display panel according to claim 1, wherein the touch layer comprises a first touch layer and a second touch layer, each of the first capacitive touch channels comprises a first portion and a second portion; in a direction perpendicular to a plane in which the display panel is located, the first portion overlaps the second capacitive touch channels, and the second portion does not overlap the second capacitive touch channels;

each of the first electromagnetic touch channels comprises a third portion and a fourth portion; in the direction perpendicular to the plane in which the display panel is located, the third portion overlaps the second electromagnetic touch channels, and the fourth portion does not overlap the second electromagnetic touch channels; and the first portion and the third portion are located at the first touch layer, and the second portion and the fourth portion are located at the second touch layer.

10. A display device, comprising a housing and a display panel, wherein the housing has an accommodating space in which the display panel is disposed, the display panel comprises a touch layer, and the touch layer comprises:

a capacitive touch part comprising a plurality of first capacitive touch channels arranged at intervals in a first direction and a plurality of second capacitive touch channels arranged at intervals in a second direction, the first capacitive touch channels extending in the second direction and the second capacitive touch channels extending in the first direction; and an electromagnetic touch part comprising a plurality of first electromagnetic touch channels arranged at intervals in the first direction and a plurality of second electromagnetic touch channels arranged at intervals in the second direction, the first electromagnetic touch channels extending in the second direction and the second electromagnetic touch channels extending in the first direction;

wherein the first direction intersects the second direction, each of the first capacitive touch channels is disposed between and insulated from two adjacent first electromagnetic touch channels, and each of the second capacitive touch channels is disposed between and insulated from two adjacent second electromagnetic touch channels, the display panel further comprises a touch driver chip and a switch selection circuit, first ends of all the first electromagnetic touch channels away from the touch driver chip in the second direction are electrically connected to each other; and second ends of all the first electromagnetic touch channels close to the touch driver chip in the second direction are electrically connected to the touch driver chip via the switch selection circuit, and the switch selection circuit independently connects or disconnects each of the first electromagnetic touch channels from the touch driver chip, so that any two first electromagnetic touch channels of all the first electromagnetic touch channels form into a closed electromagnetic coil through the switch selection circuit.

11. The display device according to claim 10, wherein first ends of every two of the first electromagnetic touch channels are electrically connected to form one first electromagnetic touch channel group; first ends of every two of the second electromagnetic touch channels are electrically connected to form one second electromagnetic touch channel group; two first electromagnetic touch channels in each first electromagnetic touch channel group are not adjacent to each other; and two second electromagnetic touch channels in each second electromagnetic touch channel group are not adjacent to each other.

12. The display device according to claim 11, wherein two first electromagnetic touch channels are disposed between any two adjacent first capacitive touch channels, and two second electromagnetic touch channels are disposed between any two adjacent second capacitive touch channels.

13. The display device according to claim 12, wherein the first capacitive touch channels located at edges of the display panel are first edge capacitive touch channels, two first electromagnetic touch channels are disposed on a side of each of the first edge capacitive touch channels away from other first capacitive touch channels and belong to different first electromagnetic touch channel groups; the second capacitive touch channels at edges of the display panel are second edge capacitive touch channels, and two second electromagnetic touch channels are disposed on a side of each of the second edge capacitive touch channels away from other second capacitive touch channels and belong to different second electromagnetic touch channel groups.

14. The display device according to claim 10, wherein one of the first capacitive touch channels is disposed between any two adjacent first electromagnetic touch channels, and one of the second capacitive touch channels is disposed between any two adjacent second electromagnetic touch channels.

15. The display device according to claim 10, wherein each of the first capacitive touch channels comprises a plurality of first touch electrodes arranged in sequence in the second direction, each of the second capacitive touch channels comprises a plurality of second touch electrodes arranged in sequence in the first direction, and the first touch electrodes and the adjacent second touch electrodes constitute one touch electrode unit of touch electrode units; and the touch electrode units are surrounded by the first electromagnetic touch channels and the second electromagnetic touch channels which are arranged in a cross manner.

16. The display device according to claim 15, wherein each of the first touch electrodes comprises a first body and two first branch parts, the first body extends in the second direction, the two first branch parts are respectively located on both sides of the first body; each of the second touch electrodes comprises a second body and two second branch parts, the second body extends in the first direction, and the two second branch parts are respectively located on both sides of the second body; and each of the first branch parts comprises a plurality of first branch strips arranged at intervals, and each of the second branch parts comprises a plurality of second branch strips arranged at intervals.

17. The display device according to claim 15, wherein dummy electrodes are disposed between the first electromagnetic touch channels and the second electromagnetic touch channels which are arranged in a cross manner and the touch electrode units, and the dummy electrodes are insulated from the first electromagnetic touch channels, the second electromagnetic touch channels, and the touch electrode units, respectively.

18. The display device according to claim 10, wherein the touch layer comprises a first touch layer and a second touch layer, each of the first capacitive touch channels comprises a first portion and a second portion; in a direction perpendicular to a plane in which the display panel is located, the first portion overlaps the second capacitive touch channels, and the second portion does not overlap the second capacitive touch channels;

each of the first electromagnetic touch channels comprises a third portion and a fourth portion; in the direction perpendicular to the plane in which the display panel is located, the third portion overlaps the second electromagnetic touch channels, and the fourth portion does not overlap the second electromagnetic touch channels; and the first portion and the third portion are located at the first touch layer, and the second portion and the fourth portion are located at the second touch layer.

* * * * *